(12) United States Patent
Buzzard et al.

(10) Patent No.: US 11,938,996 B2
(45) Date of Patent: Mar. 26, 2024

(54) STEERING COLUMN ENERGY ABSORPTION STRAP ASSEMBLY

(71) Applicant: Steering Solutions IP Holding Corporation, Saginaw, MI (US)

(72) Inventors: Donald A. Buzzard, Saginaw, MI (US); Floyd E. Eschenbacher, Jr., Freeland, MI (US); Michael P. Anspaugh, Bay City, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/990,458

(22) Filed: Nov. 18, 2022

(65) Prior Publication Data

US 2023/0159082 A1 May 25, 2023

Related U.S. Application Data

(60) Provisional application No. 63/281,429, filed on Nov. 19, 2021.

(51) Int. Cl.
*B62D 1/19* (2006.01)
(52) U.S. Cl.
CPC ..................... *B62D 1/19* (2013.01)
(58) Field of Classification Search
CPC ................. B62D 1/192; B62D 1/19
See application file for complete search history.

(56) References Cited

U.S. PATENT DOCUMENTS

| 8,657,338 | B2 * | 2/2014 | Buzzard | B62D 1/184 |
| | | | | 280/775 |
| 9,302,696 | B2 * | 4/2016 | Buzzard | B62D 1/195 |
| 9,365,235 | B2 * | 6/2016 | Kingston-Jones | F16F 7/123 |
| 9,393,986 | B1 * | 7/2016 | Anspaugh | B62D 1/184 |
| 9,623,897 | B2 * | 4/2017 | Myohoji | B62D 1/195 |
| 9,669,862 | B1 * | 6/2017 | Dubay | B62D 1/192 |
| 9,764,757 | B2 * | 9/2017 | Buzzard | B62D 1/184 |
| 9,828,019 | B2 * | 11/2017 | Dubay | B62D 1/195 |
| 9,969,345 | B2 * | 5/2018 | Dubay | F16F 7/128 |
| 10,023,223 | B2 * | 7/2018 | Anspaugh | B62D 1/195 |
| 10,259,485 | B2 * | 4/2019 | Jones | B62D 1/184 |
| 10,421,477 | B2 * | 9/2019 | Fricke | B62D 1/195 |
| 10,633,014 | B2 * | 4/2020 | Schnitzer | B62D 1/184 |
| 10,703,403 | B2 * | 7/2020 | Reno | F16F 7/128 |
| 10,843,721 | B2 * | 11/2020 | Domig | B62D 1/20 |

(Continued)

FOREIGN PATENT DOCUMENTS

| GB | 2059006 A | * 4/1981 | ............ B62D 1/192 |
| KR | 101559821 B1 | * 10/2015 | |

(Continued)

*Primary Examiner* — Paul N Dickson
*Assistant Examiner* — Maxwell L Meshaka
(74) *Attorney, Agent, or Firm* — Dickinson Wright PLLC

(57) ABSTRACT

A steering column assembly includes a lower jacket. The steering column assembly also includes an upper jacket operatively coupled to the lower jacket, the upper jacket telescopingly moveable relative to the lower jacket. The steering column assembly further includes a rake bracket operatively coupled to the lower jacket. The steering column assembly yet further includes an energy absorption strap operatively coupled to the upper jacket, at least a portion of the energy absorption strap disposed radially outward of the rake bracket.

15 Claims, 5 Drawing Sheets

(56) References Cited

U.S. PATENT DOCUMENTS

| | | | |
|---|---|---|---|
| 10,913,483 B2* | 2/2021 | Huber | B62D 1/195 |
| 10,919,562 B2* | 2/2021 | Strong | B62D 1/195 |
| 11,014,598 B2* | 5/2021 | Domig | B62D 1/197 |
| 11,052,936 B2* | 7/2021 | Gosztyla | B62D 1/192 |
| 11,091,198 B2* | 8/2021 | Bodtker | B62D 7/22 |
| 11,142,236 B2* | 10/2021 | Jones | B62D 1/184 |
| 11,203,374 B2* | 12/2021 | Anspaugh | B62D 1/184 |
| 11,225,281 B2* | 1/2022 | Anspaugh | B62D 1/195 |
| 11,345,389 B2* | 5/2022 | Buzzard | B62D 1/184 |
| 11,597,425 B2* | 3/2023 | Wu | B62D 1/184 |
| 11,613,297 B2* | 3/2023 | Buzzard | B62D 1/195 74/493 |
| 11,661,097 B1* | 5/2023 | Anspaugh | B62D 1/185 74/493 |
| 11,685,422 B1* | 6/2023 | Tinnin | B62D 1/185 74/493 |
| 2015/0027263 A1* | 1/2015 | Kern | B62D 1/187 74/495 |
| 2015/0090068 A1* | 4/2015 | Anspaugh | B62D 1/184 74/526 |
| 2015/0096404 A1* | 4/2015 | Martinez | B62D 1/195 74/492 |
| 2015/0128752 A1* | 5/2015 | Buzzard | B62D 1/195 188/377 |
| 2015/0375770 A1* | 12/2015 | Buzzard | B62D 1/184 74/495 |
| 2016/0001809 A1* | 1/2016 | Kingston-Jones | B62D 1/195 74/492 |
| 2016/0244015 A1* | 8/2016 | Dubay | B60R 21/02 |
| 2017/0259842 A1* | 9/2017 | Dubay | B62D 1/195 |
| 2017/0267273 A1* | 9/2017 | Jones | B62D 1/184 |
| 2019/0185046 A1* | 6/2019 | Reno | B62D 1/195 |
| 2020/0039570 A1* | 2/2020 | Domig | B62D 1/192 |
| 2020/0189648 A1* | 6/2020 | Domig | B62D 1/192 |
| 2020/0198685 A1* | 6/2020 | Anspaugh | B62D 1/19 |
| 2020/0317253 A1* | 10/2020 | Huber | B62D 1/195 |
| 2020/0324802 A1* | 10/2020 | Buzzard | B62D 1/189 |
| 2020/0406952 A1* | 12/2020 | Gosztyla | B62D 1/184 |
| 2021/0206420 A1* | 7/2021 | Anspaugh | B62D 1/184 |
| 2021/0245792 A1* | 8/2021 | Jones | G05G 1/04 |
| 2022/0009543 A1* | 1/2022 | Wu | B62D 1/184 |
| 2022/0266890 A1* | 8/2022 | Buzzard | B62D 1/195 |
| 2023/0159082 A1* | 5/2023 | Buzzard | B62D 1/19 74/496 |
| 2023/0192175 A1* | 6/2023 | Tinnin | B62D 1/192 74/493 |
| 2023/0211822 A1* | 7/2023 | Anspaugh | B62D 1/185 280/775 |

FOREIGN PATENT DOCUMENTS

| | | | | |
|---|---|---|---|---|
| KR | 101795442 B1 | * | 3/2016 | |
| KR | 20170111661 A | * | 10/2017 | |
| WO | WO-2014132062 A2 | * | 9/2014 | B62D 1/192 |

* cited by examiner

STEERING COLUMN ENERGY ABSORPTION STRAP ASSEMBLY

CROSS-REFERENCE TO RELATED APPLICATION

This application claims the benefits of priority to U.S. patent application Ser. No. 63/281,429, filed Nov. 19, 2021, the disclosure of which is incorporated by reference herein in its entirety.

FIELD OF THE INVENTION

The embodiments disclosed herein relate to vehicle steering column assemblies and, more particularly, to an energy absorption strap assembly for such assemblies.

BACKGROUND

A steering column assembly of a vehicle may include one or more energy absorption features. For example, an energy absorption strap (EA strap) assembly may be operatively coupled to an upper jacket and configured to unroll once a specified collapse load is exceeded. EA straps have been configured to fit inboard (i.e., radially or laterally inward) of a rake bracket. This configuration has packaging constraints with respect to upper jacket outer diameter limitations.

SUMMARY OF THE DISCLOSURE

According to one aspect of the disclosure, a steering column assembly includes a lower jacket. The steering column assembly also includes an upper jacket operatively coupled to the lower jacket, the upper jacket telescopingly moveable relative to the lower jacket. The steering column assembly further includes a rake bracket operatively coupled to the lower jacket. The steering column assembly yet further includes an energy absorption strap operatively coupled to the upper jacket, at least a portion of the energy absorption strap disposed radially outward of the rake bracket.

According to another aspect of the disclosure, a steering column assembly includes a manual rake adjustment assembly. The manual rake adjustment assembly includes a rake lever. The manual rake adjustment assembly also includes a rake bolt operatively coupled to the rake lever and rotatable therewith, the rake bolt extending through a first rake bracket leg and a second rake bracket leg. The steering column assembly also includes an energy absorption strap. The energy absorption strap includes a first leg. The energy absorption strap also includes a second leg extending substantially parallel to the first leg. The energy absorption strap further includes a curved portion connecting the first leg and the second leg. The second leg is disposed radially outward of the rake bracket.

These and other advantages and features will become more apparent from the following description taken in conjunction with the drawings.

BRIEF DESCRIPTION OF DRAWINGS

The subject matter that is regarded as the subject invention is particularly pointed out and distinctly claimed in the claims at the conclusion of this specification. The foregoing and other features and advantages of the invention are apparent from the following detailed description of non-limiting exemplary embodiments of the invention taken in conjunction with the accompanying drawing thereof in which:

DETAILED DESCRIPTION

The embodiments described herein may be utilized in a vehicle, such as a car, truck, sport utility vehicle, crossover, mini-van, marine craft, aircraft, all-terrain vehicle, recreational vehicle, or other suitable vehicle, include various steering system schemes, for example, steer-by-wire and driver interface steering. These steering system schemes typically include a steering column for translating steering input to an output that interacts with a steering linkage to ultimately cause the vehicle wheels (or other elements) to turn the vehicle.

Figure 1:
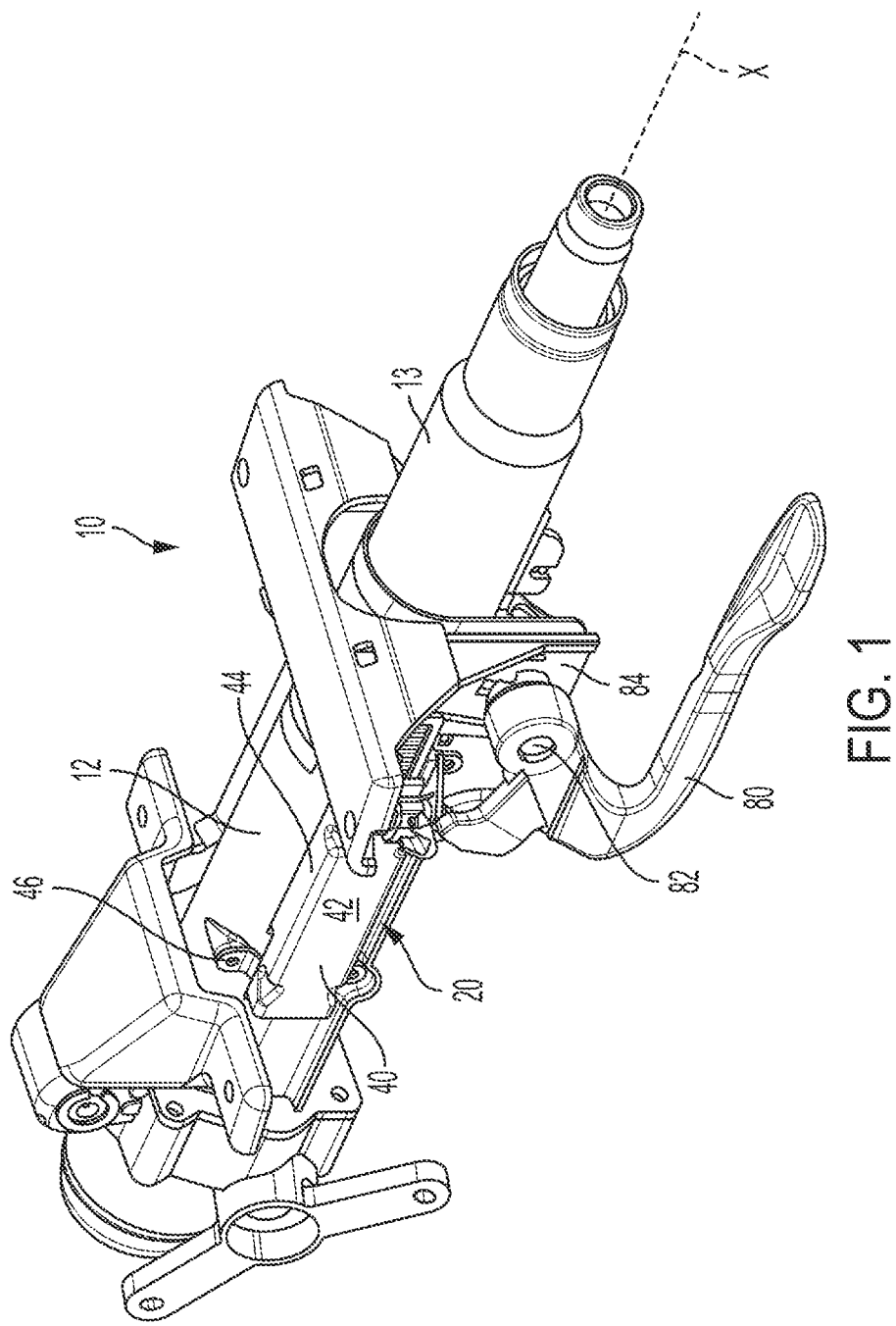
FIG. 1 is a perspective view of a steering column assembly.
Figure 2:
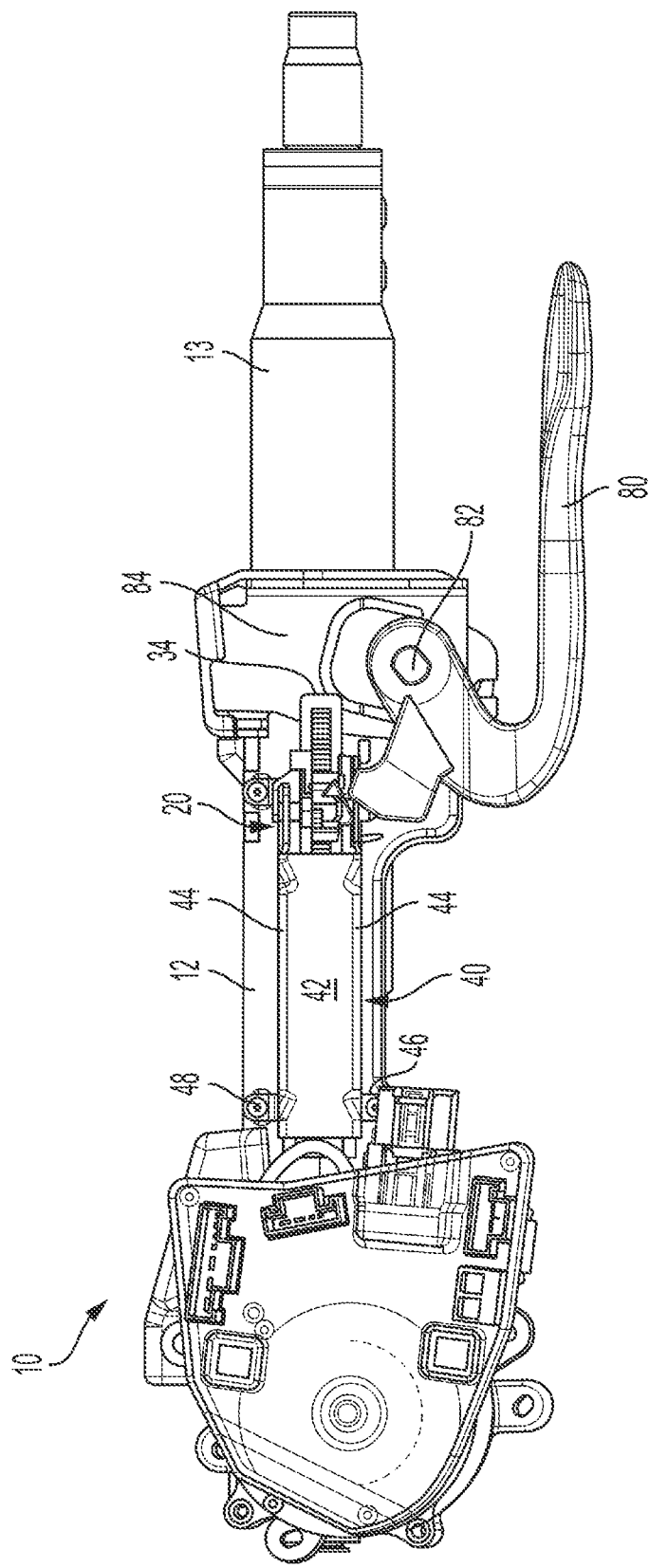
FIG. 2 is a side, elevational view of the steering column assembly.
Figure 3:
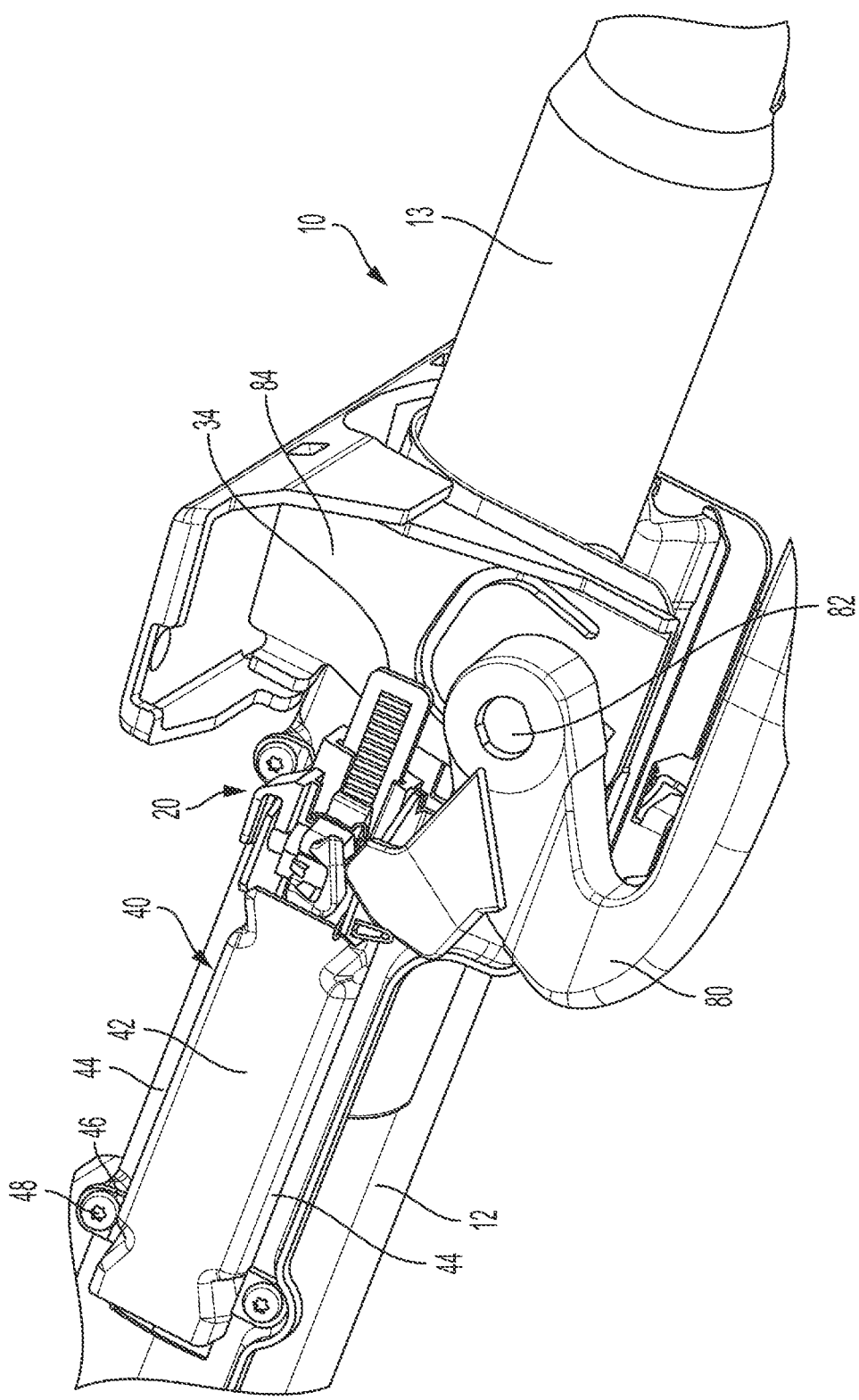
FIG. 3 is a perspective view of a portion of the steering column assembly where an energy absorption strap assembly is located.

Referring now to the Figures, FIGS. 1-3 illustrate a steering column assembly generally indicated with numeral 10. The steering column assembly 10 is for a vehicle and extends along a longitudinal axis X. The steering column assembly 10 may be adjustable in a telescopic direction generally parallel with the longitudinal axis X (i.e., adjustable along the longitudinal axis X), and adjustable in a rake direction that moves the steering column upward or downward. The steering column assembly 10 includes a lower jacket 12 and an upper jacket 13 extending along the longitudinal axis X. The upper jacket 13 has a portion extending into the lower jacket 12 and is translatable relative thereto.

The translatable motion of the upper jacket 13, relative to the lower jacket 12, allows the upper jacket—and a steering input device (e.g., handwheel) operatively coupled thereto—to be axially adjustable between positions to provide flexibility in the location of a steering input device and facilitate more comfortable driving positions for different sizes of drivers. The axial adjustment may be carried out with an electromechanical system or manually by an operator.

Rake movement of the upper jacket 13 and at least a portion of the lower jacket 12 allows the steering input device to be rotated about one or more pivot points to adjust a vertical position of the steering input device. The rake movement may also be carried out with an electromechanical system or manually by an operator. In the illustrated embodiment, a manually rake adjustable embodiment is shown. In such an embodiment, a rake lever 80 is operatively coupled to a rake bolt 82 which extends through a first rake bracket leg 84, the lower jacket 12, the upper jacket 13, and a second rake bracket leg. Adjustment of the rake lever 80 changes a clamp load with a cam assembly or the like to move the rake adjustment assembly between a locked condition and an unlocked condition, with the unlocked condition allowing manual rake adjustment.

An energy absorption strap assembly (EA strap assembly) 20 is operatively coupled to the steering column assembly 10 to assist with the energy absorption process during a collapse event of the steering column assembly 10. The EA strap assembly 20 includes a strap cover 40 that is operatively coupled to a radially outer surface of the lower jacket 12. In the illustrated embodiment, the strap cover 40 includes a longitudinally extending base segment 42 and a pair of legs 44 on each side of the base segment 42. Each of the legs 44 extend inwardly toward the lower jacket 12 and are connected to the lower jacket 12 in any suitable manner. In the illustrated embodiment, the legs 44 include flanges 46 that align with receiving holes defined by the lower jacket 12, with mechanical fasteners 48 extending through the flanges 46 to couple the cover 40 to the lower jacket 12.

Figure 4:
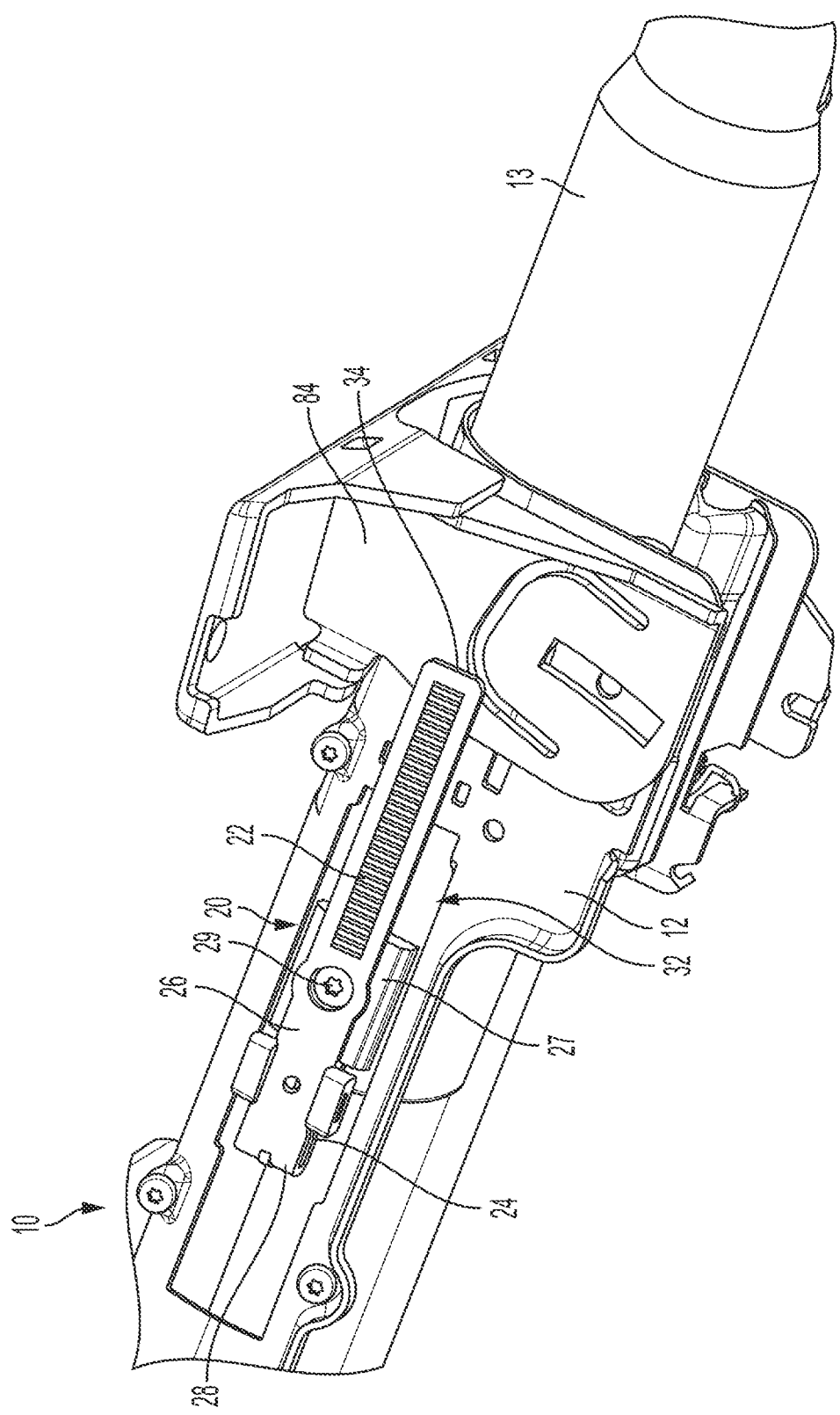
FIG. 4 is a perspective view of the energy absorption strap assembly with a strap cover removed.
Figure 5:
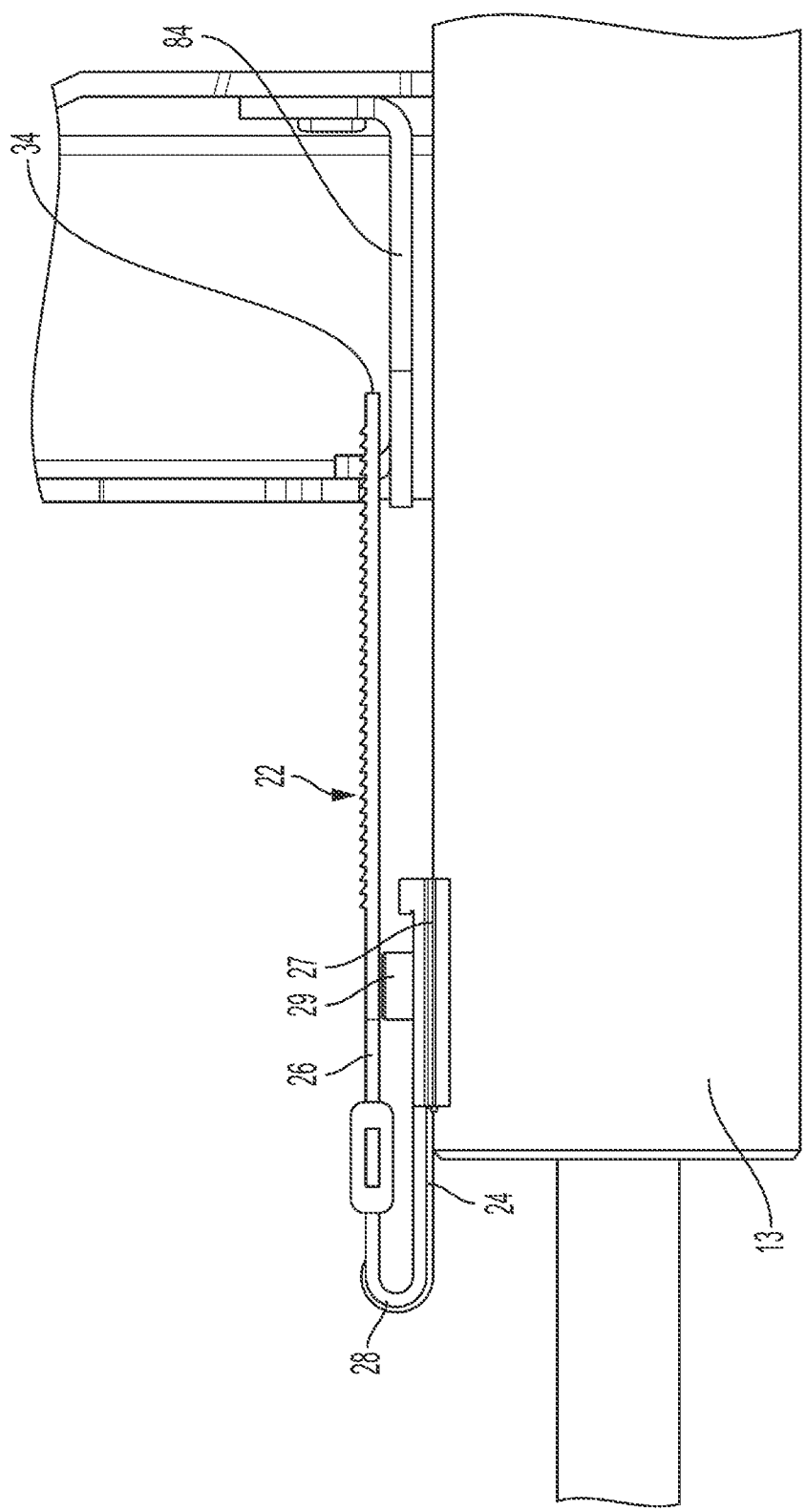
FIG. 5 is a side, elevational view of the energy absorption strap assembly with the strap cover removed.

Referring now to FIGS. 4 and 5, the strap cover 40—which covers at least a portion of an energy absorption strap (EA strap) 22—has been removed to more clearly illustrate the EA strap 22. The EA strap 22 includes a first leg 24 and a second leg 26 which are joined by a curved, transition portion 28. The first leg 24 is fixed to the upper jacket 13 and rolls during an energy absorption event. The first leg 24 may be joined to the upper jacket 13 in any suitable manner. In the illustrated embodiment, a mechanical fastener 29 extends through the first leg 24 and into the upper jacket 13 to fix the EA strap 22 to the upper jacket 13. A spacer 27 or other structural component may facilitate the coupling as well, as shown. The coupling location of the first leg 24 of the EA strap 22 and the upper jacket 13 is within a cutout portion 32 of the lower jacket 12.

FIGS. 1-5 each illustrate the second leg 26 of the EA strap 22 extending away from the curved, transition portion 28 to a terminal end 34 of the second leg 26. The second leg 26 is substantially straight and extends substantially parallel to the first leg 26. The terminal end 34 of the second leg 26 of the EA strap 22 protrudes in axial overlap with one of the rake bracket legs. In the illustrated configuration, the portion of the second leg 26 proximate the terminal end 34 is in axial overlap with the first rake bracket leg 84, but it is to be appreciated that the EA strap assembly 40 may be positioned on an opposite side of the steering column assembly 10, such that the EA strap 22 is in axial overlap with the second rake bracket leg. Regardless of the rake bracket leg that the second leg 26 overlaps with, it is to be understood that the second leg 26 is located radially outward (which may also be referred to as laterally outward) relative to the first rake bracket leg 84.

Advantageously, the embodiments disclosed herein avoid packaging constraints that were previously present in assemblies that had an EA strap radially inward of the rake bracket. Additionally, the disclosed configuration allows for a larger upper jacket outer diameter for cross-car packaging and instrument panel attachment of the steering column since the space radially—or laterally—inward of the rake bracket leg is not taken up with the EA strap 22.

While the invention has been described in detail in connection with only a limited number of exemplary embodiments, it should be appreciated that the invention is not limited to such embodiments. Rather, the invention can be modified to incorporate any number of variations, alterations, substitutions, or equivalent arrangements not heretofore described, but that are commensurate with the spirit and scope of the invention. Additionally, while various non-limiting exemplary embodiments of the invention have been described, it should be appreciated that aspects of the invention may include only some of these embodiments. Accordingly, the invention is not to be seen as limited by the foregoing description.

What is claimed is:

1. A steering column assembly comprising:
a lower jacket;
an upper jacket operatively coupled to the lower jacket, the upper jacket telescopingly moveable relative to the lower jacket;
a rake bracket operatively coupled to the lower jacket; and
an energy absorption strap operatively coupled to the upper jacket, at least a portion of the energy absorption strap disposed radially outward of the rake bracket, wherein the rake bracket is disposed between the lower jacket and the energy absorption strap.

2. The steering column assembly of claim 1, wherein at least a segment of the at least a portion of the energy absorption strap disposed radially outward of the rake bracket is in axial overlap with the rake bracket.

3. The steering column assembly of claim 1, wherein the energy absorption strap is operatively coupled to the upper jacket through a cutout defined by the lower jacket.

4. The steering column assembly of claim 1, wherein the energy absorption strap comprises:
a first leg operatively coupled to the upper jacket;
a second leg extending substantially parallel to the first leg; and
a curved portion connecting the first leg and the second leg.

5. The steering column assembly of claim 4, wherein the second leg is disposed radially outward of the rake bracket.

6. The steering column assembly of claim 4, wherein the second leg is in axial overlap with the rake bracket.

7. The steering column assembly of claim 1, wherein the energy absorption strap is operatively coupled to the upper jacket with a mechanical fastener.

8. The steering column assembly of claim 7, further comprising a spacer disposed between the energy absorption strap and the upper jacket, wherein the mechanical fastener extends through the energy absorption strap, the spacer and into the upper jacket.

9. The steering column assembly of claim 1, further comprising a manual rake adjustment assembly operatively coupled to the lower jacket to adjust a rake position of the steering column assembly, the manual rake adjustment assembly comprising:
a rake lever; and
a rake bolt operatively coupled to the rake lever and rotatable therewith, the rake bolt extending through a the rake bracket and an additional rake bracket, wherein rotation of the rake lever and the rake bolt changes a clamp load on the steering column assembly.

10. A steering column assembly comprising:
a manual rake adjustment assembly comprising:
a rake lever; and
a rake bolt operatively coupled to the rake lever and rotatable therewith, the rake bolt extending through a first rake bracket leg and a second rake bracket leg; and
an energy absorption strap comprising:
a first leg;
a second leg extending substantially parallel to the first leg;
a curved portion connecting the first leg and the second leg; and
wherein the second leg is disposed radially outward of the rake bracket, relative to a central, longitudinal axis of the steering column assembly.

11. The steering column assembly of claim 10, wherein at least a segment of the second leg is in axial overlap with the rake bracket.

12. The steering column assembly of claim 10, further comprising:

a lower jacket; and
an upper jacket operatively coupled to the lower jacket, the upper jacket telescopingly moveable relative to the lower jacket, wherein the first leg of the energy absorption strap is operatively coupled to the upper jacket and the manual rake adjustment assembly is operatively coupled to the lower jacket.

13. The steering column assembly of claim 12, wherein the energy absorption strap is operatively coupled to the upper jacket through a cutout defined by the lower jacket.

14. The steering column assembly of claim 12, wherein the energy absorption strap is operatively coupled to the upper jacket with a mechanical fastener.

15. The steering column assembly of claim 14, further comprising a spacer disposed between the energy absorption strap and the upper jacket, wherein the mechanical fastener extends through the energy absorption strap, the spacer and into the upper jacket.

\* \* \* \* \*